(12) United States Patent
Dworak et al.

(10) Patent No.: US 6,617,393 B2
(45) Date of Patent: Sep. 9, 2003

(54) AQUEOUS BINDER MIXTURE

(75) Inventors: Gert Dworak, Graz (AT); Roland Feola, Graz (AT); Johann Gmoser, Graz (AT); Werner Staritzbichler, Graz (AT)

(73) Assignee: Solutia Austria GmbH, Werndorf (AU)

(*) Notice: Subject to any disclaimer, the term of this patent is extended or adjusted under 35 U.S.C. 154(b) by 0 days.

(21) Appl. No.: 09/975,425

(22) Filed: Oct. 11, 2001

(65) Prior Publication Data

US 2002/0077389 A1 Jun. 20, 2002

(30) Foreign Application Priority Data

Oct. 17, 2000 (AT) .......................................... 1780/2000

(51) Int. Cl.$^7$ ............................. C08L 75/04; C08L 67/02
(52) U.S. Cl. .................. 524/591; 524/524; 524/839; 524/840; 524/845; 525/123
(58) Field of Search ................. 524/507, 539, 524/591, 839, 840; 525/123, 455

(56) References Cited

U.S. PATENT DOCUMENTS

| | | |
|---|---|---|
| 5,013,598 A | 5/1991 | Guerro et al. |
| 5,250,164 A | 10/1993 | Valko |
| 5,346,947 A * | 9/1994 | Guerro et al. ............... 524/591 |
| 6,020,499 A | 2/2000 | Drysdale et al. |
| 6,372,108 B1 * | 4/2002 | Hoenig et al. ............... 204/501 |
| 6,406,753 B2 * | 6/2002 | Dworak et al. ............. 427/379 |

FOREIGN PATENT DOCUMENTS

| | | |
|---|---|---|
| DE | 34 28 204 A | 2/1986 |
| EP | 0 102 566 A1 | 3/1984 |
| EP | 0 517 707 | 9/2001 |
| JP | 01186838 | 3/1991 |
| WO | WO 93/01245 A1 | 2/1993 |
| WO | WO 93/02 231 A1 | 2/1993 |
| WO | WO 94/07932 A1 | 4/1994 |
| WO | WO 98/50345 A1 | 11/1998 |

* cited by examiner

Primary Examiner—Tae H. Yoon
(74) Attorney, Agent, or Firm—ProPat, L.L.C.

(57) ABSTRACT

Aqueous binder mixtures comprising a water-dilutable resin and a water-miscible hydroxy urethane have an increased mass fraction of solids and may be formulated in combination with curatives which are active at elevated temperature to give automobile primer-surfacer materials.

9 Claims, No Drawings

AQUEOUS BINDER MIXTURE

FIELD OF THE INVENTION

The invention relates to aqueous binder mixtures, to a process for preparing them and to their use for formulating baking varnishes, especially water-dilutable primer-surfacers for automobile finishing.

BACKGROUND OF THE INVENTION

There is a general desire to maximize the mass fraction of binders (resins) and pigments in paints in order to shorten the drying times and to minimize the amount of energy required for drying. This is particularly significant with waterborne paints, owing to the high vaporization enthalpy of water. At the same time, however, there should not be a disproportionate increase in the viscosity of the paint in the application form, in order not to impair application and impede the flow of the paint on the substrate.

Aqueous primer-surfacer materials whose binders comprise water-dilutable polyurethane resins and/or polyester resins are customary. Primer-surfacer materials of this kind are described, for example, in EP-A 0 517 707, where the mass fraction of water is approximately 45%.

SUMMARY OF THE INVENTION

Surprisingly it has now been found that by means of binder combinations comprising water-miscible hydroxy urethanes as one constituent it is possible to raise significantly both the mass fraction of solids of the respective binder combinations in the supply form and also the mass fraction of solids in the formulated paint.

The invention therefore provides aqueous binder mixtures comprising a water-dilutable resin and a water-miscible hydroxy urethane, the water-dilutable resin being selected from polyesters which have been anionically modified by incorporation of bishydroxyalkylcarboxylic acids or polycarboxylic acids whose carboxyl groups differ in their reactivity with respect to polycondensation; polyesters obtainable by cocondensing polyfunctional alcohols and acids with a functionality of more than 2, the acids being used in excess; and condensation products AB of hydroxyl group-containing resins B, which on their own are not water-soluble, and water-soluble or water-dispersible resins A containing acid groups, the resins A and B being selected independently of one another from the groups of the polyester resins mentioned supra, alkyd resins, polyurethane resins, polyacrylate resins and epoxy resins.

DETAILED DESCRIPTION OF THE PREFERRED EMBODIMENTS

Water-miscible in the context of the present invention means that the substance in question as a binary mixture with water forms single-phase mixtures over the entire concentration range.

Water-dilutable binders are the known synthetic resins, especially polyester resins, alkyd resins, polyurethane resins, polyacrylate resins, ketone resins and aldehyde resins, polyamide resins and epoxy resins which have been rendered hydrophilic by addition of emulsifiers or by chemical modification, i.e., are dispersible in water or at least partly soluble in water and form stable single-phase or multiphase mixtures with water.

As emulsifiers it is possible to use the known anionic, cationic, amphoteric and nonionic substances whose lipophilic radicals are selected from linear and branched (saturated or unsaturated) alkyl groups, aryl groups and alkylaryl groups. Preferred anionic hydrophilic groups include carboxylate, sulfonate, sulfate, phosphate and phosphonate groups; preferred cationic hydrophilic groups include quaternary ammonium groups or amino groups which are able to form ammonium compounds on addition of acid; preferred amphoteric structural elements include ammonium groups and carboxylate groups present in the same molecule; and preferred nonionic hydrophilic groups include polyoxyethylene, polyoxypropylene, polyol, especially sugar alcohol, and poly- or oligo-saccharide groups.

The synthetic resins become hydrophilic by chemical modification by virtue of the fact that substances containing the abovementioned hydrophilic groups are incorporated into the synthetic resins chemically by means of appropriate reaction (during the synthesis) or are grafted onto the finished resins. The type and amount of the hydrophilicizing substance must be chosen according to the nature of the resin. Preference is given to those synthetic resins whose hydrophilicity has been generated by incorporating anionic groups or groups which are convertible into anionic groups upon addition of bases. One preferred example of anionic modification is the incorporation of bis(hydroxyalkyl) carboxylic acids such as dimethylolpropionic acid or of polycarboxylic acids whose carboxyl groups differ in reactivity with respect to polycondensation, such as citric acid or trimellitic acid. Where monomers with acid functionality are used in the synthesis of the resins, it is likewise possible to build branched or dendritic molecule structures by using reactants having a funtionality of more than 2, in which case there should be acid groups at the ends of the branches in each case. In the case of polyesters this is particularly easy to do, for example, by cocondensing polyfunctional alcohols or acids (i.e., those with a functionality of more than 2), where acids should be used in excess. In this way it is possible to synthesize those resins having a sufficient number of acid groups for hydrophilicization. Preferentially, these anionically modified hydrophilic resins contain no cationic groups or groups which form cations in water upon addition of acids.

Particularly suitable binders are condensation products AB of hydroxyl group-containing resins B which on their own are not water-soluble, and water-soluble or water-dispersible resins A containing acid groups, the resins A and B being selected independently from one another from the stated groups of polyester resins, alkyd resins, polyurethane resins, polyacrylate resins and epoxy resins.

Resins which are referred to as not being water-soluble are those where, following mixing and attainment of an equilibrium with 10 times the mass of water at room temperature, the aqueous phase contains a mass fraction of less than 5% of the resin in question. Otherwise, the resins are referred to as (partially) water-soluble or as water-dispersible.

The resin A, containing acid groups, preferably has an acid number of from 100 to 230 mg/g, in particular from 70 to 160 mg/g, and the resin B, containing hydroxyl groups, preferably has a hydroxyl number of from 50 to 500 mg/g, in particular from 60 to 350 mg/g.

The acid number is defined in accordance with DIN 53 402 as the ratio of the mass $M_{KOH}$ of potassium hydroxide required to neutralize a sample under analysis to the mass $m_B$ of this sample (mass of the solids in the sample in the case of solutions or dispersions); its customary unit is "mg/g". The hydroxyl number is defined in accordance with DIN 53 240 as the ratio of that mass $m_{KOH}$ of potassium hydroxide which has exactly the same number of hydroxyl groups as a sample under analysis to the mass $m_B$ of this sample (mass of the solids in the sample in the case of solutions or dispersions); its customary unit is "mg/g".

The formerly so-called "limiting viscosity number" called "Staudinger index" $J_g$ in accordance with DIN 1342, part 2.4, is the limiting value of the Staudinger function $J_v$ at decreasing concentration and shear stress, $J_v$ being the relative change in viscosity based on the mass concentration $\beta_B = m_B/V$ of the dissolved substance B (with the mass $m_B$ of the substance in the volume V of the solution); i.e., $J_v = (\eta_r - 1)/\beta_B$. Here, $\eta_r - 1$ is the relative change in viscosity, in accordance with the equation $\eta_r - 1 = (\eta - \eta^s)/\eta_s$. The relative viscosity $\eta_r$ is the ratio of the viscosity $\eta$ of the solution under analysis to the viscosity $\eta_s$ of the pure solvent. (The physical meaning of the Staudinger index is that of a specific hydrodynamic volume of the solvated polymer coil at infinite dilution and in the state of rest.) The unit commonly used for J is "cm$^3$/g"; formerly often "dl/g".

The condensation products AB preferred for the invention preferably have an acid number of from 25 to 75 mg/g, in particular from 30 to 50 mg/g. Their Staudinger index ("limiting viscosity number") is usually from 10 to 20 cm$^3$/g, in particular from 12 to 19 cm$^3$/g, and with particular preference from 13 to 18 cm$^3$/g. They are prepared using the components A and B preferably in a mass ratio of from 10:90 to 80:20, in particular from 15:85 to 40:60.

The resins A containing carboxyl groups are preferably selected from polyester resins A1, polyurethane resins A2 the so-called maleate oils A3 fatty acids and fatty acid mixtures A4 grafted with unsaturated carboxylic acids, and acrylate resins A5 Instead of or in a mixture with resins containing carboxyl groups, it is also possible to use epoxy resins modified with phosphoric acid and/or phosphonic acids, or similarly modified reaction products of epoxy resins with fatty acids, referred to collectively as A6 Preferably, the acid number of the resins A is from 100 to 230 mg/g, in particular from 70 to 160 mg/g. Their Staudinger index, measured in dimethylformamide as solvent at 20° C., is generally from about 6.5 to 12 cm$^3$/g, preferably from 8 to 11 cm$^3$/g.

Suitable polyester resins A1 may be prepared in a conventional manner from polyols A11 and polycarboxylic acids A12, it being possible for some—preferably up to 25%—of the amount of substance of the polyols and polycarboxylic acids to be replaced by hydroxycarboxylic acids A13. By appropriate choice of the type and amount of the starting materials A11 and A12 it is ensured that the resulting polyester has a sufficient number of acid groups, in accordance with the acid number indicated above. The polyols A11 are preferably selected from the aliphatic and cycloaliphatic alcohols having 2 to 10 carbon atoms and on average at least two hydroxyl groups per molecule; glycol, 1,2- and 1,3-propanediol, 1,4-butanediol, 1,6-hexanediol, neopentyl glycol, di- and triethylene glycol, di- and tripropylene glycol, glycerol, trimethylolpropane and trimethylolethane are particularly suitable. Suitable polycarboxylic acids A12 are aliphatic, cycloaliphatic and aromatic polycarboxylic acids such as adipic acid, succinic acid, cyclohexanedicarboxylic acid, phthalic acid, isophthalic and terephthalic acid, trimellitic acid, trimesic acid and benzophenonetetracarboxylic acid. It is also possible to use compounds having both carboxylic acid groups and sulfonic acid groups, such as sulfoisophthalic acid, for example.

Suitable polyurethane resins A2 may be prepared by reacting aliphatic polyols A21, as defined under A11, hydroxyalkanecarboxylic acids A22 having at least one, preferably two, hydroxyl groups and a carboxyl group which under esterification conditions is less reactive than adipic acid; preference is given to the use of dihydroxymonocarboxylic acids selected from dimethylolacetic acid, dimethylolbutyric acid and dimethylolpropionic acid; oligomeric or polymeric compounds A25 having on average at least two hydroxyl groups per molecule, which may be selected from polyether polyols A251, polyester polyols A252, polycarbonate polyols A253, saturated and unsaturated dihydroxyaliphatic compounds A254, which are obtainable by oligomerizing or polymerizing dienes having 4 to 12 carbon atoms, especially butadiene, isoprene and dimethylbutadiene, followed by functionalization in a known manner, and also polyfunctional isocyanates A23, selected preferably from aromatic, cycloaliphatic and also linear and branched aliphatic difunctional isocyanates such as tolylene diisocyanate, bis(4-isocyanatophenyl)methane, tetramethylxylylene diisocyanate, isophorone diisocyanate, bis(4-isocyanatocyclohexyl)methane, hexamethylene diisocyanate and 1,6-diisocyanato-3,5,5- and -3, 5,5-trimethylhexane.

Particular preference is given to those polyurethane resins A2 which are prepared by reacting a mixture of one or more polyols A21 with a hydroxyalkanecarboxylic acid A22 and at least one polyfunctional isocyanate A23 which has been at least partly blocked, usually to the extent of more than 20%, preferably to the extent of more than 35% and, in particular, to the extent of 50% or more with monohydroxy compounds A24 selected from polyalkylene glycol monoalkyl ethers HO—(R$^1$—O)$_n$—R$^2$ where R$^1$ is a linear or branched alkylene radical having 2 to 6, preferably 2 to 4 carbon atoms and R$^2$ is an alkyl group having 1 to 8, preferably 2 to 6 carbon atoms, and/or oximes of aliphatic ketones having 3 to 9 carbon atoms. The degree of blocking is stated here as the ratio of the number of blocked isocyanate groups to the total number of isocyanate groups (blocked and unblocked) present in the isocyanate A23. It is further preferred to prepare the polyurethane resins A2 by reacting a mixture of a polyfunctional isocyanate and a polyfunctional isocyanate blocked as described above with the hydroxyalkanecarboxylic acid A22 and the polyols A21 and A25, the mixing ratios being chosen so that each molecule of the polyurethane A2 contains on average one or more than one terminal blocked isocyanate group.

"Maleate oil" A3 is a term used to denote reaction products of (drying) oils A31 and olefinic unsaturated carboxylic acids A32, especially dicarboxylic acids. Oils A31 used are preferably drying and semidrying oils such as linseed oil, tallow oil, rapeseed oil, sunflower oil and cottonseed oil, having iodine numbers of from about 100 to about 180 cg/g. The unsaturated carboxylic acids A32 are selected so that under the customary conditions they graft free-radically (following addition of initiators or following heating) onto the initial charge of oils with a yield (fraction of the unsaturated carboxylic acids bonded to the oil after the reaction, based on the amount used for the reaction) of more than 50%. Particularly suitable is maleic acid in the form of its anhydride, as are tetrahydrophthalic anhydride, acrylic acid and methacrylic acid, and also citraconic acid, mesaconic acid and itaconic acid.

Equally suitable resins A4 are fatty acids or fatty acid mixtures A41 grafted with the unsaturated acids specified under A32, said fatty acids or fatty acid mixtures A41 being obtainable in industrial amounts by saponification of fat. Suitable fatty acids have at least one olefinic double bond in the molecule; those which may be listed by way of example include oleic acid, linoleic and linolenic acid, ricinoleic acid and elaidic acid, and also the stated technical-grade mixtures of such acids.

Further suitable resins A5 are the acidic acrylate resins obtainable by copolymerization of olefinically unsaturated carboxylic acids A51 and other vinyl or acrylic monomers A52. The carboxylic acids are those already mentioned under A32, especially acrylic and methacrylic acid and also vinylacetic acid and also crotonic and isocrotonic acid and the monoesters of olefinically unsaturated dicarboxylic acids, such as monomethyl maleate and monomethyl fumarate, for example. Suitable monomers A52 are the alkyl esters of acrylic and methacrylic acid having preferably 1 to 8 carbon atoms in the alkyl group, (meth)acrylonitrile, hydroxyalkyl (meth)acrylates having 2 to 6 carbon atoms in the alkyl group, styrene, vinyltoluene, and also vinyl esters of aliphatic linear and branched carboxylic acids having 2 to 15 carbon atoms, especially vinyl acetate and the vinyl ester of a mixture of branched aliphatic carboxylic acids having on average 9 to 11 carbon atoms. It is also advantageous to copolymerize the monomers specified under A51 and A52 in the presence of compounds A53 which react with the unsaturated carboxylic acids with addition and formation of a carboxyl- or hydroxyl-functional, copolymerizable compound. Examples of such compounds are lactones A531, which react with the carboxylic acids A51 with ring opening to form a carboxyl-functional unsaturated compound, and epoxides A532, especially glycidyl esters of α-branched saturated aliphatic acids having 5 to 12 carbon atoms, such as of neodecanoic acid or neopentanoic acid, which react with the acid A51 with addition to give a copolymerizable compound containing a hydroxyl group. The amount of substance of the compounds used should be such that the required acid number is reached. If this compound A53 is introduced as the initial charge and the polymerization is conducted so that this compound is used as (sole) solvent, solvent-free acrylate resins are obtained.

Epoxy resins modified with phosphoric acid or phosphonic acids or the likewise-modified adducts of epoxy resins and fatty acids, A6, are prepared by reacting phosphoric acid or organic phosphonic acids which are at least dibasic with epoxy resins or adducts of epoxy resins and fatty acids, preferably in a solvent. The amount of substance of the phosphoric or phosphonic acid used is normally such that all of the epoxide groups are consumed by the reaction with the acid and such that a sufficient number of acid groups is still available after the reaction. The resulting resin has hydroxyl groups (from the reaction of the oxirane group with the acid function), these hydroxyl groups being positioned β to the ester group, and also acid groups of the phosphoric or phosphonic acid which were not consumed by the reaction with the epoxide. Examples of suitable phosphoric or phosphonic acids are orthophosphoric acid $H_3PO_4$, phosphorous acid $H_3PO_3$, alkanephosphonic acids having 1 to 18, especially 1 to 12, carbon atoms in the alkyl radical such as methanephosphonic and ethanephosphonic acid, and also phenylphosphonic acid.

Suitable hydroxyl-containing resins B are, in particular, polyesters B1, acrylate resins B2, polyurethane resins B3 and epoxy resins B4. The hydroxyl number of the resins B is generally from about 50 to 500 mg/g, preferably from about 60 to 350 mg/g, and with particular preference from 70 to 300 mg/g. Their Staudinger index, measured at 20° C. in dimethylformamide as solvent, is preferably from 8 to 13 $cm^3/g$, in particular from 9.5 to 12 $cm^3/g$.

Like the component A1, the polyesters B1 are prepared by polycondensation; in this case all that is necessary is to select the type and amount of the starting materials such that there is an excess of hydroxyl groups over the acid groups, it being necessary for the condensation product to have the hydroxyl number indicated above. This may be achieved by using polyhydric alcohols containing on average at least two, preferably at least 2.1, hydroxyl groups per molecule, with dicarboxylic acids or with a mixture of polycarboxylic and monocarboxylic acids containing on average not more than two, preferably from 1.5 to 1.95, acid groups per molecule. Another possibility is to use a corresponding excess of hydroxyl components (polyols) B11 over the acids B12. The polyols B11 and the polyfunctional acids B12 which are reacted in the polycondensation reaction to give the hydroxyl-containing polyesters B1 are selected from the same groups as the polyols A11 and the acids A12. It is likewise possible here to replace some of the polyols and acids by hydroxy acids in accordance with A13. The aim is for the acid number of component B not to exceed 20 mg/g and to be preferably below 18 mg/g. The acid number may be reduced, for example, by reacting the condensed polyester B1 with a small amount of monofunctional aliphatic alcohols A14 under esterification conditions. The amount of alcohols A14 is such that, although the acid number is reduced below the limit, the Staudinger index does not fall below the stated lower limit. Examples of suitable aliphatic alcohols are n-hexanol, 2-ethylhexanol, isodecyl alcohol and tridecyl alcohol.

The hydroxyl group-containing acrylate resins B2 are obtainable by usually free-radically initiated copolymerization of hydroxyl group-containing acrylic monomers B21 with other vinyl or acrylic monomers B22 without such functionality. Examples of the monomers B21 are esters of acrylic and methacrylic acid with aliphatic polyols, especially diols having 2 to 10 carbon atoms, such as hydroxyethyl and hydroxypropyl (meth)acrylate. Examples of the monomers B22 are the alkyl esters of (meth) acrylic acid with 1 to 10 carbon atoms in the alkyl groups, such as methyl, ethyl, n-butyl and 2-ethylhexyl (meth)acrylate, (meth)acrylonitrile, styrene, vinyltoluene, vinyl esters of aliphatic monocarboxylic acids having 1 to 10 carbon atoms, such as vinyl acetate and vinyl propionate. Preference is also given to those acrylate resins prepared not, as is usual, in solution but instead in a bulk polymerization in which the initial charge comprises a liquid cyclic compound which acts as solvent during the polymerization reaction and which by means of ring opening forms a copolymerizable compound on reaction with one of the monomers used. Examples of such compounds are glycidyl esters of α-branched aliphatic monocarboxylic acids, especially the acids or acid mixtures available commercially as neopentanoic acid or neodecanoic acid, and also lactones such as ε-caprolactone or δ-valerolactone. Where these glycidyl esters are used, it is necessary during the polymerization to use comonomers containing acid groups, such as (meth) acrylic acid, in an amount which is at least equimolar to the amount of substance of the epoxide groups. The lactones may be used, with ring opening, both with hydroxyl group-containing comonomers and with comonomers containing acid groups.

Hydroxyl group-containing polyurethane resins B3 are obtainable in a known manner by addition of oligomeric or polymeric polyols B31, selected from polyester polyols, polyether polyols, polycarbonate polyols and polyolefin polyols, and, if desired, low molar mass aliphatic diols or polyols B33 having 2 to 12 carbon atoms, such as ethylene glycol, 1,2- and 1,3-propylene glycol, 1,4-butanediol, 1,6-hexanediol, di- and tri-ethylene and/or propylene glycol, neopentyl glycol, trimethylolpropane, pentaerythritol, and polyfunctional isocyanates B32, the latter being used in a substoichiometric amount such that the number of hydroxyl groups in the reaction mixture is greater than the number of isocyanate groups. Suitable polyols are, in particular, oligomeric and polymeric dihydroxy compounds having a number-average molar mass $M_n$ of from about 200 to 10 000 g/mol. By means of polyaddition with polyfunctional, especially difunctional, isocyanates, they are built up to the target value for the Staudinger index of at least 8 cm$^3$/g, preferably at least 9.5 cm $^3$/g.

Epoxy resins B4 obtainable by reacting epichlorohydrin with aliphatic or aromatic diols or polyols, especially bisphenol A, bisphenol F, resorcinol, novolaks or oligomeric polyoxyalkylene glycols having 2 to 4, preferably 3, carbon atoms in the alkylene group have at least one hydroxyl group per epichlorohydrin molecule used. Instead of the reaction of epichlorohydrin with diols it is also possible to prepare the appropriate epoxy resins by the so-called advancement reaction from diglycidyl ethers of diols (such as those mentioned above) or dicidyl esters of dibasic organic acids with the stated diols. All known epoxy resins may be used here, provided they satisfy the condition for the hydroxyl number.

The water-miscible hydroxy urethanes C contain at least one hydroxyl group and at least one urethane group, preferably at least two hydroxyl groups and at least two urethane groups. The hydroxy urethanes C may be prepared by reacting primary linear, branched or cyclic amines with cyclic aliphatic carbonates. The amines contain at least one, preferably at least two, primary amino groups. They may also contain further secondary or tertiary amino groups or ether groups. Particular preference is given to aliphatic linear, branched or cyclic primary diamines having 2 to 18, preferably 3 to 12, carbon atoms. Likewise preferred are oligo(oxyalkylene)diamines of the formula $H_2N$—(R—O)$_n$—R—$NH_2$, where R may denote an ethylene or 1,2- or 1,3-propylene radical or mixtures of these radicals, and n is a number from 1 to 20. The cyclic carbonates are preferably monocarbonates, in other words esters of carbonic acids with glycol, 1,2- and 1,3-propanediol and neopentyl glycol. These hydroxy urethanes may also be prepared by reacting corresponding linear, branched or cyclic aliphatic isocyanates with aliphatic diols having 2 to 6 carbon atoms, preferably glycol, 1,2- and 1,3-propanediol and neopentyl glycol. It is also possible to use biscyclocarbonates obtainable, for example, by reacting oligomers of propylene glycol with epichlorohydrin followed by reaction with carbon dioxide to give the biscyclocarbonate. It is also possible to prepare hydroxy urethanes by mixing the stated carbonates with the stated amines.

The hydroxy urethanes are used in amounts such that the binder mixture comprising the water-dilutable resins and the hydroxy urethanes comprises mass fractions from 5 to 50% of hydroxy urethanes and from 95 to 50% of the water-dilutable resins (based in each case on the solids fraction of the binder mixture). With preference, the mass fractions are from 10 to 40% for the hydroxy urethane and from 90 to 60% for the water-dilutable resin, in particular from 15 to 35% and from 85 to 65%, respectively.

The binder combinations of the invention may be used to formulate any desired aqueous paints and coating materials. They are particularly suitable for formulating baking varnishes comprising curatives which become active only at elevated temperatures (preferably above 80° C., in particular above 100° C.). Examples of such curatives are the known amino resins, especially melamine resins, and blocked isocyanates. Baking varnishes based on the binder combinations of the invention may be used with particular advantage for aqueous primer-surfacers in automobile finishing. These primer-surfacer materials further include pigments, and certain additives such as corrosion inhibitors, leveling agents, antisettling agents, adhesion promoters and defoamers. In addition to the increase in the mass fraction of solids, it has surprisingly been found that the binder combinations of the invention may be processed to primer-surfacer materials which result in coatings having greater resistance toward stone chipping.

EXAMPLES

The examples illustrate the invention without restricting it in its scope. All figures with the unit "%" are mass fractions and denote "cg/g" or "g/(100 g)", with the exception of the degree of neutralization, for which the amount of substance fraction of the neutralized acid groups, based on the sum of the amounts of substance of neutralized or non-neutralized acid groups, is stated in "%" ("cmol/mol" or "mol/100 mol").

By "completely water-dilutable" or "infinitely water-dilutable" is meant here that upon gradual addition of water (up to about 10 times the mass of the resin solution employed) to the resin solution with stirring, no clouding or separation was observed.

In the examples the following abbreviations have been used:

| | |
|---|---|
| DGM | diethylene glycol dimethyl ether |
| MIBK | methyl isobutyl ketone |
| TDI | tolylene diisocyanate (commercially customary isomer mixture containing about 80% 2,4-TDI and about 20% 2,6-TDI) |

The iodine number is defined in accordance with DIN 53 241-1 as a ratio of that mass $m_I$ of iodine which is added onto the olefinic double bonds of a sample under analysis, and is discolored in the process, to the mass $m_B$ of this sample (mass of the solids in the sample in the case of solutions or dispersions); its customary unit is "g/(100 g)" or "cg/g".

Preparation of the Polycarboxyl Components

Water-Dilutable Polyurethane (AI):

A suitable reaction vessel was charged with a solution of 810 g (6 mol) of dimethylolpropionic acid in 946 g of DGM and 526 g of MIBK. A mixture of 870 g (5 mol) of TDI and 528 g (2 mol) of a TDI semi-blocked with ethylene glycol monoethyl ether was added to this solution at the same time at 100° C. over the course of 4 hours. As soon as all the NCO groups had reacted, the batch was diluted to a mass fraction of solids of 60% with a mixture of DGM and MIBK (mass ratio 2:1). The component (A1) had an acid number of 140 mg/g and a Staudinger index ("limiting viscosity number"), measured in N,N-dimethylformamide (DMF) at 20° C., of 9.3 cm $^3$/g.

The semiblocked TDI was prepared by adding 90 g (1 mol) of ethylene glycol monoethyl ether to 174 g (1 mol) of TDI at 30° C. over the course of 2 hours followed by reaction until the mass fraction of unreacted isocyanate groups in the mixture ("NCO value") was from 16 to 17%.

Water-Dilutable Polyurethane (AII):

In the same way as for (AI), 945 g (7 mol) of dimethylolpropionic acid in 1 079 g of DGM and 599 g of MIBK were reacted with 1 044 g (6 mol) of TDI and 528 g (2 mol) of a TDI semiblocked ethylene glycol monoethyl ether. The component (AII) has a mass fraction of solids of 60%, an acid number of 140 mg/g and a Staudinger index, measured in N,N-dimethylformamide (DMF) at 20 ° C., of 10.2 cm $^3$/g.

Water-Dilutable Polyester (AIII):

140 g (1.3 mol) of diethylene glycol and 152 g (1.1 mol) of trimethylolpropane were weighed into a 3-necked flask equipped with stirrer and reflux condenser. The mixture was heated to 100° C. under inert gas, with stirring, and at that temperature, 109 g (0.6 mol) of isophthalic acid, 96 g (0.6 mol) of adipic acid and finally 198 g (1.3 mol) of phthalic anhydride were added in portions. Utilizing the exothermicity that occurred, the temperature was raised to 130° C.

After the mixture had been held at 130° C. for 2 hours, it was heated slowly to 180° C. and esterification was carried out to an acid number of 50 mg/g, with separation of the water of reaction that was then obtained.

When the acid number had been reached, the mixture was diluted to a mass fraction of solids of 60% with butyl glycol and finally neutralized by addition of 14 g (0.16 mol) of N,N-dimethylethanolamine.

The product thus obtained was infinitely water-dilutable.

Preparation of the Polyhydroxyl Components Polyester (BI):

In a suitable reaction vessel, 130 g (1.1 mol) of 1,6-hexanediol, 82 g (0.6 mol) of pentaerythritol, 8 g (0.05 mol) of isononanoic acid, 28 g (0.1 mol) of ricinenic fatty acid (dehydrated castor oil fatty acid) and 50 g (0.3 mol) of isophthalic acid were esterified at 210° C. to an acid number of less than 4 mg/g. The viscosity of a 50% strength solution in ethylene glycol monobutyl ether, measured as the efflux time in accordance with DIN 53211 at 20° C., was 125 seconds; the Staudinger index, measured in N,N-dimethylformamide at 20° C., was 9.8 cm³/g.

Polyester (BII):

In the same way as for (BI), 38 g (0.2 mol) of tripropylene glycol, 125 g (1.2 mol) of neopentyl glycol, 28 g (0.1 mol) of isomerizied linoleic acid, 83 g (0.5 mol) of isophthalic acid and 58 g (0.3 mol) of trimellitic anhydride were esterified at 230° C. to an acid number of less than 4 mg/g. The viscosity of a 50% strength solution in ethylene glycol monobutyl ether, measured as the efflux time in accordance with DIN 53211 at 20° C., was 165 seconds. The Staudinger index, measured in N,N-dimethylformamide at 20° C., was 10.5 cm³/g.

Preparation of the Binder Components (AB)

In accordance with the mass ratios indicated in table 1, the polycarboxyl components (A) and the polyhydroxyl components (B) were mixed with one another and the solvent present was substantially removed under reduced pressure in the course of heating to a reaction temperature of 160° C. This temperature was maintained until the desired acid number had been reached, at which point a sample was perfectly water-dilutable following neutralization with dimethylethanolamine. 70 g of the condensate obtained in this way were mixed at 90° C. with 30 g in each case of a dihydroxy urethane C, neutralized with the corresponding amount of dimethylethanolamine to a degree of neutralization of 80% (based on the acid groups present in each case), and, following a 30-minute homogenization period, diluted in portions with water to a viscosity of below 3 000 mPa•s at 23° C.

In the case of the comparative example, 30 parts of a low molecular mass hydroxyl-containing polyester (PE) were admixed instead of the dihydroxy urethanes.

In the case of the blank sample, the condensate of the polycarboxyl component (A) and the polyhydroxyl component (B) without further modification was neutralized as indicated above and diluted with water.

Preparation of the Dihydroxy Urethanes as Admix Resins (C)

A 3-necked flask equipped with stirrer and reflux condenser was charged with 116 g (1.0 mol) of 2-methyl-1,5-pentanediamine, and 204 g (2 mol) of propylene carbonate were added over the course of 1 hour with stirring at 30° C. During the addition, the temperature of the batch was allowed to rise to 60° C. by exothermic reaction, and it was held further at this temperature (occasional cooling required). After the end of the addition, it was heated to 120° C. and held at this temperature until an amine number of less than 5 mg/g had been reached. The amine number is defined in accordance with DIN 53 176 as the ratio of that mass $m_{KOH}$ of potassium hydroxide which consumes precisely the same amount of acid in neutralization as a sample under analysis to the mass $m_B$ of that sample (mass of the solids in the sample in the case of solutions or dispersions); its customary unit is "mg/g". This gave an infinitely water-dilutable product having a limiting viscosity number (measured in DMF at 23° C.) of 3.9 ml/g.

An "infinitely water-dilutable" or "infinitely water-miscible" compound is one which has no miscibility gap with water and no macroscopic separation following 24 hours of storage at room temperature (23° C.). Compounds referred to as "partially water-dilutable" are those which in a binary system with water do in fact have a miscibility gap, recognizable from a pronounced Tyndall effect, yet form single-phase mixtures up to concentrations of 20% (20 g of the compound in question with 80 g of water).

In analogy to the procedure described above, further dihydroxy urethanes were prepared (see table 1).

Abbreviations used:

| | |
|---|---|
| DH | 1,6-diaminohexane (molar mass: 116 g/mol) |
| DMP | 1,5-diamino-2-methylpentane (molar mass: 116 g/mol) |
| D230 | Jeffamine D230 ® (Huntsman) (molar mass: 230 g/mol) |
| DCH | 1,2-diaminocyclohexane (molar mass: 114 g/mol) |
| DP | 1,3-diaminopentane (molar mass: 102 g/mol) |
| EC | ethylene carbonate (molar mass: 88 g/mol) |
| PC | propylene carbonate (molar mass: 102 g/mol) |

TABLE 1

| Admix resin | Amine type\|amount of substance\|mass | Carbonate type\|amount of substance\|mass | Staudinger index cm³/g | Water dilut- ability |
|---|---|---|---|---|
| C 2 | DMP\|1 mol\|116 g | PC\|2 mol\|204 g | 3.9 | complete |
| C 3 | D230\|1 mol\|230 g | PC\|2 mol\|204 g | 3.8 | complete |
| C 4 | DCH\|1 mol\|114 g | PC\|2 mol\|204 g | 3.5 | complete |
| C 7 | D230\|0.5 mol\|230 g DCH\|0.5 mol\|114 g | EC\|2 mol\|176 g | 3.8 | complete |
| C 8 | DMP\|1 mol\|116 g | EC\|2 mol\|176 g | 4.1 | complete |
| C 5 | DP\|1 mol\|102 g | PC\|2 mol\|204 g | 4.0 | partial |
| C 1 | DH\|1 mol\|116 g | PC\|2 mol\|204 g | 4.2 | partial |
| C 6 | DH\|1 mol\|116 g | PC\|1 mol\|102 g EC\|1 mol\|88 g | 4.5 | partial |

Polyester PE (Comparative Example)

A 3-necked flask equipped with stirrer and reflux condenser was charged with 150 g (1.0 mol) of triethylene glycol and this initial charge was heated to 120° C. under inert gas. Then 148 g (1.0 mol) of phthalic anhydride were added and the temperature was raised to 150° C., utilizing the exothermicity which occurred. After an acid number of 180 mg/g had been reached, 134 g (1.0 mol) of trimethylolpropane were added, the batch was heated slowly to 220° C., a distillation circuit was set up using xylene, and esterification was continued, with separation of the water of reaction produced, until an acid number of below 5 mg/g had been reached. Finally, the azeotrope former was stripped off by distillation under reduced pressure.

TABLE 2

| Example | Component (A) mass in g - type | Component (B) mass in g - type | Acid number in mg/g | Admix resin (C) mass in g type | Viscosity at 23° C. in mPa · s | Mass fraction of solids in the binder in % (increase) | Mass fraction of solids in the paint in % (increase) |
|---|---|---|---|---|---|---|---|
| 1 | 25 AI | 45 BI | 42 | 30 C1 | 2545 | 36.4 (1.5) | 51.0 (1.1) |
| 2 | 20 AII | 50 BII | 38 | 30 C2 | 2430 | 43.8 (7.8) | 55.7 (6.4) |
| 3 | 25 AI | 45 BI | 43 | 30 C3 | 2922 | 45.5 (10.6) | 57.5 (7.6) |
| 4 | 25 AI | 45 BI | 42 | 30 C4 | 2166 | 43.9 (9.0) | 55.7 (5.8) |
| 5 | 25 AI | 45 BI | 45 | 30 C5 | 2388 | 36.2 (1.3) | 50.9 (1.0) |
| 6 | 25 AI | 45 BI | 44 | 30 C6 | 1970 | 35.6 (0.7) | 50.4 (0.5) |
| 7 | 20 AII | 50 BII | 39 | 30 C7 | 2867 | 46.2 (10.2) | 58.0 (8.7) |
| 8 | 25 AI | 45 BI | 41 | 30 C8 | 2620 | 45.2 (10.3) | 57.3 (7.4) |
| 9 | 70 AIII | — | 51 | 30 C1 | 2745 | 37.4 (1.0) | 51.7 (0.7) |
| 10 | 70 AIII | — | 49 | 30 C3 | 2050 | 47.3 (10.9) | 58.8 (7.8) |
| 11 | 70 AIII | — | 49 | 30 C7 | 2330 | 46.9 (10.5) | 58.5 (7.5) |
| Comparative examples: | | | | | | | |
| 12 | 25 AI | 45 BI | 42 | 30 PE | 2750 | 35.4 (0.5) | 50.3 (0.4) |
| 13 | 25 AI | 45 BI | 43 | — | 2620 | 34.9 (0) | 49.9 (0) |
| 14 | 70 AIII | — | 50 | 30 PE | 2636 | 37.0 (0.6) | 51.4 (0.4) |
| 15 | 70 AIII | — | 50 | — | 2574 | 36.4 (0) | 51.0 (0) |
| 16 | 20 AII | 50 BII | 37 | 30 PE | 2608 | 36.1 (0.1) | 49.5 (0.2) |
| 17 | 20 AII | 50 BII | 38 | — | 2521 | 36.0 (0) | 49.3 (0) |

Technical Testing of the Binders of the Invention as Automobile Primer-Surfacers The binders according to the examples 1 to 17 were formulated as aqueous automobile primer-surfacer materials in accordance with the formulas indicated in table 3. The paints were each adjusted to a viscosity of 120 mPa·s (1.2 poise) by adding water, applied to cleaned glass plates using a 150 μm coating bar and then baked at 165° C. for 20 minutes.

TABLE 3

| | | Primer-surfacer paints | | | | | |
|---|---|---|---|---|---|---|---|
| Paint | | 1 | 2 | 3 | 4 | 5 | 6 |
| Mass of BM [binder] 3 | in g | 197.8 | | | | | |
| Mass of BM 7 | in g | | 194.8 | | | | |
| Mass of BM 10 | in g | | | 190.3 | | | |
| Mass of BM 13 (compar.) | in g | | | | 257.9 | | |
| Mass of BM 17 (compar.) | in g | | | | | 250.0 | |
| Mass of BM 15 (compar.) | in g | | | | | | 247.2 |
| Wetting agents[1] | in g | 1.2 | 1.2 | 1.2 | 1.2 | 1.2 | 1.2 |
| Water[2] | in g | 24 | 25 | 22 | 6 | 4 | 6 |
| Titanium dioxide | in g | 60 | 60 | 60 | 60 | 60 | 60 |
| Filler[3] | in g | 60 | 60 | 60 | 60 | 60 | 60 |
| MH[4] | in g | 30 | 30 | 30 | 30 | 30 | 30 |
| Accelerator[5] | in g | 0.6 | 0.6 | 0.6 | 0.6 | 0.6 | 0.6 |
| Water[6] | in g | 43.8 | 42.2 | 44.1 | 65.3 | 81.0 | 65.6 |
| Mass of paint | in g | 417.4 | 413.3 | 408.2 | 481.0 | 486.8 | 470.6 |
| Mass fraction of solids | in % | 57.5 | 58.0 | 58.8 | 49.9 | 49.3 | 51.0 |
| Technical testing | | | | | | | |
| Appearance of the cured film | | free of defects | | | | | |
| Dry film thickness | in μm | 35 | 37 | 35 | 34 | 33 | 36 |
| Pendulum hardness[7] | in s | 127 | 117 | 113 | 138 | 133 | 129 |

Key:
[1]wetting agent is ® Surfynol 104 E (air products)
[2]deionized water
[3]filler is barium sulfate (blanc fix super F from Sachtleben)

TABLE 3-continued

| | Primer-surfacer paints | | | | | |
|---|---|---|---|---|---|---|
| Paint | 1 | 2 | 3 | 4 | 5 | 6 |

[4]melamine curative (® Maprenal MF 904 from Vianova Resins GmbH & Co. KG)
[5]accelerator is ® Nacure 155 (dinonylnaphthalene-disulfonic acid, 55% strength solution in isobutanol, King Industries)
[6]deionized water added to adjust the viscosity to 120 mPa · s
[7]König pendulum hardness In combination with appropriate water-soluble melamine resins and/or blocked isocyanates, baking varnishes are produced which are particularly suitable as primer-surfacers for the automobile industry.

Metal Test Panels for the Stone Chip Test

Test system: Bonder 26 60 OC as substrate, 25 μm of a customary electrocoat primer (baked at 165° C. for 30 minutes), 35 μm of aqueous primer-surfacer as per varnishes 1 and 2 (test panel 1 and 2) and aqueous primer-surfacer as per varnishes 4 and 5 (test panel 3 and 4) of table 3 as comparison (in each case baked at 165° C. for 20 minutes), then 40 μm of commercially customary melamine-cured acrylic topcoat (baked at 140° C. for 30 minutes)

The test panels prepared in this way was stored under standard conditions for 24 hours and then subjected to a stone chip test in accordance with VDA [German automakers' association] standard 621-487 (2 runs each with 0.5 kg of angular shot, pressure: 0.1 MPa (=1 bar)). The stone chip characteristics compiled in table 4 show that much better results in stone chipping are achieved with the binder mixtures of the invention than with the same binders without the hydroxy urethanes as admix resins.

TABLE 4

Stone chip test

|  | Test panel 1 | Test panel 2 | Test panel 3 | Test panel 4 |
|---|---|---|---|---|
| Stone chip characteristics | 0 to 1 | 1 | 1 to 2 | 2 to 3 |

Evaluation in accordance with the standard:
0 no flaking of topcoat from primer-surfacer
10 complete detachment of topcoat from primer-surfacer

What is claimed is:

1. An aqueous binder mixture comprising a water-dilutable resin and a water-miscible hydroxy urethane, wherein the water-dilutable resin is selected from polyesters which have been anionically modified by incorporation of bishydroxyalkylcarboxylic acids; polyesters which have been anionically modified by incorporation of polycarboxyl acids whose carboxyl groups differ in their reactivity with respect to polycondensation; polyesters obtained by cocondensing polyfunctional alcohols and acids with a functionality of more then 2, the acids being used in excess; and condensation products AB with an acid number of from 25 to 75 mg/g, and a Staudinger Index, measured in dimethyl formamide, from 10 to 20 $cm^3/g$, made of hydroxyl-containing resins B with a hydroxyl number of from 50 to 500 mg/g and a Staudinger index measured in dimethyl formamide, of from 8 to 13 $cm^3/g$, which on their own are not water-soluble, and water-soluble or water-dispersible resins A containing acid groups with an acid number of from 100 to 230 mg/g and a Staudinger index measured in dimethyl formamide of from 6.5 to 12 $cm^3/g$, the resins A and B being selected independently of one another from the stated groups of the polyester resins, alkyd resins, polyurethane resins, polyacrylate resins and epoxy resins.

2. The aqueous binder mixture as claimed in claim 1, wherein as water-dilutable resin use is made of condensation products AB of hydroxyl-containing resins B which on their own are not water-soluble, and water-soluble or water-dispersible resins A containing acid groups, the resins A and B being selected independently from one another from the stated groups of polyester resins, alkyd resins, polyurethane resins, polyacrylate resins and epoxy resins.

3. The aqueous binder mixture as claimed in claim 1, wherein as water-dilutable resins use is made of branched or dendritic molecules having acid groups at the ends of the branches.

4. The aqueous binder mixture as claimed in claim 1, wherein the mass fraction of the water-dilutable resins in the solids of the binder mixture is from 95 to 50% and the mass fraction of hydroxy urethanes is from 5 to 50%, the mass fractions of the two components adding up to 100%.

5. The aqueous binder mixture as claimed in claim 1, wherein as hydroxy urethanes use is made of reaction products of linear, branched or cyclic aliphatic cyclocarbonates and primary amines.

6. The aqueous binder mixture as claimed in claim 5, wherein monocarbonates are used.

7. The aqueous binder mixture as claimed in claim 5, wherein aliphatic diprimary amines are used.

8. An aqueous coating material comprising an aqueous binder mixture as claimed in claim 1 and curatives which become active at elevated temperatures of more than 80° C.

9. The aqueous coating material as claimed in claim 8 for use as a primer-surfacer material for automobiles, further comprising a mass fraction of at least 15% of pigments.

* * * * *